United States Patent
Ranka et al.

(10) Patent No.: US 6,393,178 B2
(45) Date of Patent: May 21, 2002

(54) MICROSTRUCTURE OPTICAL FIBERS FOR DISPERSION MANAGEMENT IN OPTICAL COMMUNICATION SYSTEMS

(75) Inventors: Jinendra Kumar Ranka, Brookline, MA (US); William Alfred Reed, Summit; Robert Scott Windeler, Annandale, both of NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/773,696

(22) Filed: Feb. 1, 2001

Related U.S. Application Data

(60) Provisional application No. 60/186,951, filed on Mar. 4, 2000.

(51) Int. Cl.$^7$ .................................................. G02B 6/26
(52) U.S. Cl. ........................................ 385/28; 359/161
(58) Field of Search ................... 385/16–33, 122–129, 385/147; 359/124, 125, 130, 134; 372/96, 124, 125, 130, 106, 21–24, 43, 50

(56) References Cited

U.S. PATENT DOCUMENTS

| | | | |
|---|---|---|---|
| 5,726,786 A | * 3/1998 | Heflinger | 359/121 |
| 5,920,588 A | * 7/1999 | Watanabe | 359/124 |
| 6,097,870 A | * 8/2000 | Ranka et al. | 385/122 |

OTHER PUBLICATIONS

Ranka et al., Visible Continuum . . . , Optics Lett., vol. 25, No. 1, pp. 25–27 (Jan. 2000).
Windeler et al., Novel Properties . . . , OFC 2000, pp. ThG3–1 to 3–2 (Mar. 2000).
Windeler, Novel Properties . . . , OSA 2000, Annual Meeting, pp. 74 (Oct. 2000).
Windeler, Novel Properties . . . , CLEO 2000, pp149 (Sep. 2000).
Ranka et al., Optical Properties . . . , Optics Lett., vol. 25, No. 11, pp. 796–798 (Jun. 2000).
Ashish et al., Dispersion–compensating . . . , Optics Lett., vol. 18, No. 11, pp. 924–926 (Jun. 1993).
Birks et al., Dispersion Compensation . . . , IEEE PTL, vol. 11, No. 6, pp. 674–676 (Jun. 1999).
Brechet et al., Accurate Computation . . . , ECOC'99, pp. I–(26–27) (Sep. 1999).
Marcou et al., Monmode Photonic Band . . . , ECOC'99, pp I–(24–25) (Sep. 1999).
Bennett et al., Towards Practical . . . , ECOC'99, pp. I–(20–24) (Sep. 1999).

* cited by examiner

*Primary Examiner*—Akm E. Ullah
(74) *Attorney, Agent, or Firm*—Michael J. Urbano

(57) ABSTRACT

A fiber optic system comprises an optical transmitter, an optical receiver, and an optical fiber transmission path that optically couples the transmitter and the receiver to one another. The transmission path includes a first section that has negative dispersion at an operating wavelength $\lambda_0$ greater than about 1300 nm and a second section that includes a MOF. The MOF has relatively large anomalous dispersion at $\lambda_0$ and is sufficiently long to compensate the accumulated negative dispersion in the first section. In one embodiment the MOF comprises a core, a lower index cladding that includes one or more layers of air holes surrounding the core, characterized in that the diameter of the core is less than about 8 $\mu$m and the difference in effective refractive index between the core and cladding is greater than about 0.1 (10%). Preferably, the cladding contains no more than 2 layers of air holes and the distance between the nearest edges of adjacent air holes is less than about 1 $\mu$m.

12 Claims, 2 Drawing Sheets

MICROSTRUCTURE OPTICAL FIBERS FOR DISPERSION MANAGEMENT IN OPTICAL COMMUNICATION SYSTEMS

CROSS-REFERENCE TO RELATED APPLICATIONS

This application claims priority from provisional application Ser. No. 60/186,951 filed on Mar. 4, 2000 and was concurrently filed with application Ser. No. 09/778,702 (Ranka 3–13), now allowed entitled Applications of Multimode Microstructure Optical Fibers.

FIELD OF THE INVENTION

This invention relates generally to dispersion management in fiber optic systems and, more particularly, to the use of microstructure optical fibers (MOFs) to achieve dispersion compensation.

BACKGROUND OF THE INVENTION

High bit rate optical transmission systems require periodic dispersion compensation to correct for the pulse broadening and distortion that occurs due to the dispersion of the transmission fiber. The accumulated dispersion over multiple amplifier spans can often limit the maximum data transmission rate. See, Agrawal, *Fiber Optic Communication Systems*, Ch. 9, John Wiley & Sons (1997), which is incorporated herein by reference. To minimize the limitation of system performance due to dispersion, a single wavelength system can be made to operate near the zero-dispersion wavelength of the transmission fiber span. For state-of-the-art multiple wavelength systems, this type of operation is not possible due to the broadband spectral transmission and the detrimental nonlinear effects that occur between multiple wavelengths when operating near the zero-dispersion wavelength of a long fiber span. In order to avoid serious nonlinear impairments, fiber designed for dense wavelength division multiplexed (DWDM) systems in the 1550 nm range typically have dispersion values D between +2 and +6 ps/nm-km for terrestrial systems and between −2 to −10 ps/nm-nkm for undersea systems. In a terrestrial system the accumulated dispersion over each transmission span is typically compensated through the use of a section of dispersion compensating fiber that provides net dispersion of equal magnitude and of opposite sign to the dispersion of the span. Dispersion compensating fiber (DCF) with an anomalous dispersion value D ~−80 ps/nm-km at 1550 nm is easily achieved requiring only about 10 km of DFC compensate for an 80 km transmission span. See, Vengsarkar et al., *Optics Lett.*, Vol. 18, No. 11, pp. 924–926 (Jun. 1993), which is also incorporated herein by reference.

On the other hand, the maximum positive dispersion value that can be achieved in standard silica optical fibers is limited to the value of silica material dispersion, which ranges from 0 ps/nm-km at ~1290 nm to 20 ps/nm-km at 1550 nm. Conventional optical fibers can be designed such that the net dispersion can be significantly lower than this value but not higher. This limitation is inherent in standard fibers used to compensate for fiber spans where the accumulated dispersion D is negative. Silica fiber can compensate only for wavelengths above ~1290 nm, and long lengths of fiber would be necessary due to the relatively small maximum value of positive dispersion that can be achieved. Fiber that is presently being installed for use in DWDM systems at 1550 nm has normal (negative) D below ~1450 nm, and there are not practical broadband fiber solutions for dispersion compensation at shorter wavelengths. For example, a system operating at 1350 nm over an 80 km span of TrueWave® (a trademark of Lucent Technologies Inc.) fiber with D=−10.5 ps/nm-km would require over 40 km of standard fiber to compensate for the accumulated dispersion, and it can not compensate for dispersion slope.

Microstructure optical fibers (MOFs) have recently been shown to exhibit large values of anomalous dispersion (positive D) for wavelengths above ~700 nm with peak values greater than 100 ps/nm-km for simple structures. See, U.S. Pat. No. 6,097,870 filed on May 17, 1999 and issued on Aug. 1, 2000 to J. K. Ranka and R. S. Windeler (hereinafter the *Ranka-Windeler* patent) and J. K. Ranka et al., *Optics Lett.*, Vol. 25, No. 1, pp. 25–27 (Jan. 2000), both of which are incorporated herein by reference. However, the dispersion of this type of MOF design at wavelengths above 1300 nm has not been discussed in the literature.

SUMMARY OF THE INVENTION

In accordance with one aspect of our invention, a fiber optic system comprises an optical transmitter, an optical receiver, and an optical fiber transmission path that optically couples the transmitter and the receiver to one another. The transmission path includes a first section that has negative dispersion at an operating wavelength $\lambda_0$ greater than about 1300 mn and a second section that includes a MOF. The MOF has relatively large anomalous dispersion at $\lambda_0$ and is sufficiently long to compensate the accumulated negative dispersion in the first section. In one embodiment the MOF comprises a core, a lower index cladding that includes one or more layers of air holes surrounding the core, characterized in that the diameter of the core is less than about 8 $\mu$m and the difference in effective refractive index between the core and cladding is greater than about 0.1 (10%). Preferably, the cladding contains no more than 2 layers of air holes and the distance between the nearest edges of adjacent air holes is less than about 1 $\mu$m. Although such a fiber would be multimode, light (i.e., optical radiation) entering the fiber would be launched into the fundamental mode and would remain guided in that mode.

BRIEF DESCRIPTION OF THE DRAWING

Our invention, together with its various features and advantages, can be readily understood from the following more detailed description taken in conjunction with the accompanying drawing, in which.

Figure 1:
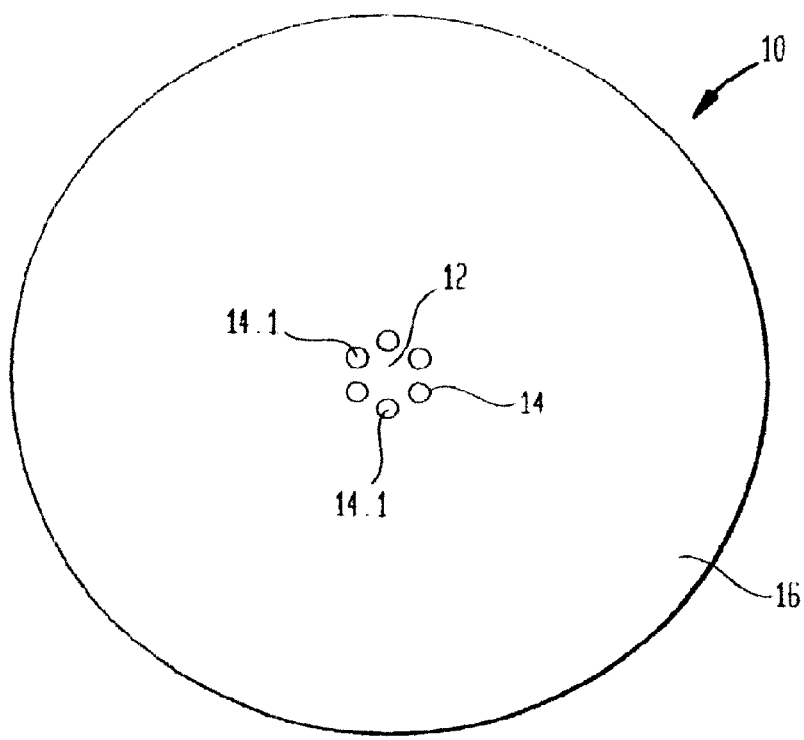
FIG. 1 is a schematic, cross-sectional view of a microstructure optical fiber in accordance with one embodiment of our invention in which a single layer of air holes forms a closely packed hexagon.
Figure 2:
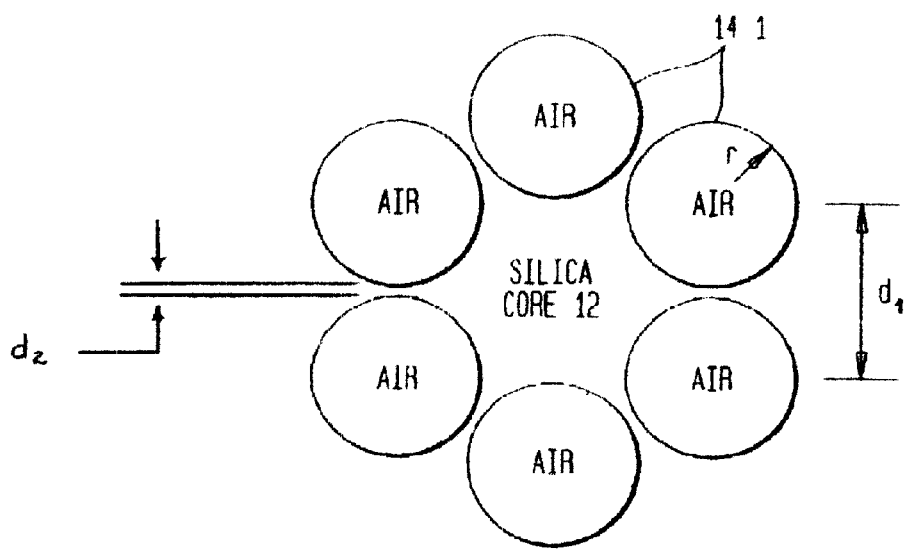
FIG. 2 is an expanded view of the core and air hole regions of the fiber of FIG. 1.
Figure 4:
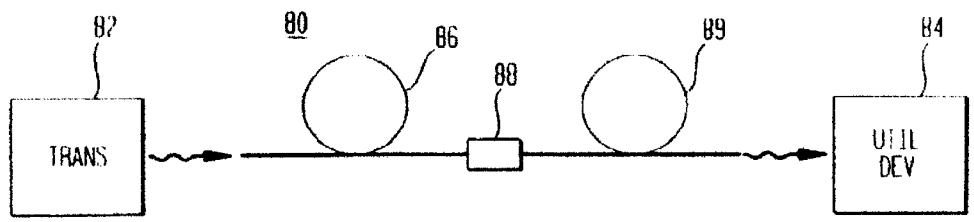
FIG. 4 is a block-diagrammatic view of an optical communication system in accordance with another embodiment of our invention.

In the interest of clarity and simplicity, FIGS. 1, 2 and 4 have not been drawn to scale.

DETAILED DESCRIPTION OF THE INVENTION

This description will be divided into three sections: first, we describe the general design of microstructure optical fibers (MOFs); second we describe modifications of the general design that render MOFs suitable for generating relatively large, anomalous dispersion (positive D) at wavelengths above about 1300 nm; and third, we discuss applications of such fibers.

Microstructure Fiber Design

With reference now to FIG. 1, we show a schematic cross-section of a MOF 10 of the type described in the Ranka-Windeler patent, supra. The core 12 is surrounded by an inner cladding 14 and an outer cladding 16. The core may be doped or undoped; solid or liquid; birefringent or non-birefringent. It may take on a variety of shapes; e.g., essentially circular or elliptical. The effective refractive index of the inner cladding 14 is lower than that of the core in order to provide index-guiding of radiation propagating down the longitudinal axis of the fiber. On the other hand, the outer cladding 16 provides strength to the fiber. The inner cladding 14 includes a multiplicity of relatively low index cladding features 14.1 that serve to lower the effective refractive index of the inner cladding and to provide index-guiding of radiation propagating in the core. Illustratively, these features constitute capillary air holes that have circular cross sections and are formed in a higher index matrix of, for example, glass. Typically the core and outer cladding are also made of glass, and typically also the glass is silica. The outer cladding, however, need not include features of the type designed into the inner cladding.

At least one relatively thin "layer" of inner cladding features is positioned circumferentially and wrapped around the core to form a closely packed polygon The Ranka-Windeler patent defines thin to mean that the outermost, circumferential boundary of the features is less than about 10–30 $\mu$m from the outermost, circumferential boundary of the core. Features beyond about 10–30 $\mu$m play no significant role in the index guiding of radiation modes at vis-nir wavelengths, defined in the Ranka-Windeler patent as visible to near infra-red wavelengths. In the case of a single layer of features, the distance between the two boundaries is approximately equal to the size (e.g., diameter) of the features. FIG. 2 illustrates such a single layer design for the case where the features are air holes and the pattern formed by their cross-sections is a hexagon; the core, as well as the interstitial spaces between the air holes, comprise silica. Illustratively, and as applied to the embodiments of this invention, the air holes and the core are essentially circular, the effective core diameter is about 0.5 to 8 $\mu$m (e.g., 2–4 em), the effective core area is about 0.2 to 50 $\mu m^2$, the diameter of the air holes is about 0.5 to 7 $\mu$m (e.g., 1.8–3.6 $\mu$m), and the center-to-center spacing $d_1$ of the air holes is about 0.5 to 7 $\mu$m (e.g., 1.6 $\mu$m). A common outer diameter of the fiber is about 125 $\mu$m although other sizes are suitable. A is relatively large, illustratively about >10% to 30%, where $\Delta=(n_{\mathit{eff,core}} - n_{\mathit{eff,clad}})/ n_{\mathit{eff,core}}$, expressed as a percent. MOFs of this type can be single mode or multimode.

Preferred Embodiment

In order to exhibit relatively large anomalous dispersion (e.g., >20 ps/nm-km) at wavelengths above about 1300 nm (e.g., in the wavelength range of about 1200–1700 nm), a MOF in accordance with one embodiment of our invention comprises core that has diameter less than about 8 $\mu$m and the effective refractive index difference between the core and the inner cladding is greater than about 0.1 (10%). Preferably, the inner cladding contains no more than two layers of air holes, and the distance $d_2$ between the nearest edges of adjacent air holes is less than about 1 $\mu$m. Although such a fiber would be multimode, light (i.e., optical radiation) entering the fiber would be launched into the fundamental mode and would remain guided in that mode.

Figure 3:
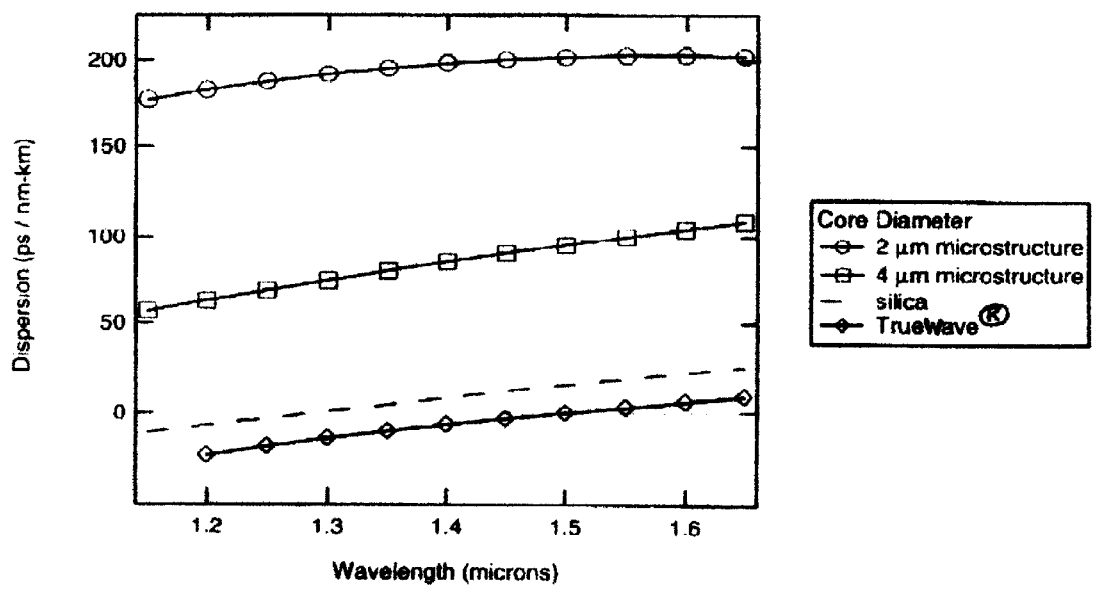
FIG. 3 compares calculated dispersion profiles of two MOFs (circles and squares) with measured dispersion profiles of bulk silica (dashed line) and TrueWave® fiber (diamonds)

FIG. 3 shows calculated dispersion profiles of two silica MOFs with different core diameters that provide relatively large anomalous dispersion in the wavelength range of about 1.2–1.7 $\mu$m in accordance with illustrative embodiments or our invention. One of the MOFs had a core diameter of about 2 $\mu$m (circles in FIG. 3), an air hole diameter of about 1.8 $\mu$m, $\Delta$ of about 27%, and $d_2$ of about 0.1 $\mu$n, whereas the other MOF had a core diameter of about 4 $\mu$m (squares in FIG. 3), an air hole diameter of about 3.6 $\mu$m, $\Delta$ of about 27% and $d_2$ of about 0.2 $\mu$m. The dispersion profiles of bulk silica (dashed line) and an illustrative silica TrueWave® fiber (diamonds) are shown for comparison. The core of the TrueWave® fiber had a $\Delta$ of about 0.0053, an alpha of about 5, and a radius of about 3.5 $\mu$m. A down-doped ring (having a $\Delta$ of about −0.0017 and a radius of about 5.4 $\mu$m) surrounded the core, and an up-doped ring (having a $\Delta$ of about 0.0012 and a radius of about 7.9 $\mu$m) surrounded the down-doped ring.

As the data indicate, a MOF having a 4 $\mu$m core in accordance with one embodiment of our invention can exhibit anomalous dispersion of about 50–100 ps/nm-km in this wavelength range. Moreover, the amount of such dispersion can be increased significantly by making the core diameter smaller. Thus, a MOF having 2 $\mu$m core can exhibit anomalous dispersion of about 175–200 ps/nm-km in the same wavelength range.

In general an MOF in accordance with our invention can readily be designed to have anomalous dispersion in excess of 20 ps/nm-km, which is approximately the maximum dispersion of silica glass.

Applications

As shown in FIG. 4 a communication system 80 includes an optical fiber that provides a communication link between an optical transmitter 82 and utilization device 84. The transmitter is typically a laser-based transmitter. The utilization device may be a piece of terminal equipment, an optical receiver, a photodetector, an optical amplifier, etc. The link may include one or more optical devices 88 well known in the art such as optical amplifiers, couplers, multiplexers, isolators etc. that couple a first fiber section 86 to a second fiber section 89. In accordance with one embodiment of our invention, at least one of the segments (e.g., segment 86) comprises a single mode optical fiber that has negative dispersion (e.g., standard optical fiber) at a wavelength $\lambda_0$ above about 1300 mn and at least one segment (e.g., segment 89) comprises a MOF, in accordance with one embodiment of our invention, that has anomalous dispersion at $\lambda_0$, and the transmitter includes an optical source (e.g., a laser) that generates a signal that includes at least one component at $\lambda_0$. Illustratively, segment 86 comprises a relatively long span of standard fiber that tends to have a relatively small negative dispersion, but over the entire length of the span (e.g., 50 km) the accumulated dispersion in the segment can be very large (e.g., −100 ps/nm). Yet, segment 89 may be a relatively short span of MOF that has relatively high anomalous dispersion (e.g., 100 ps/nm-km) and, therefore, is able to compensate the entire accumulated dispersion in only a 1 km length of MOF. In order to achieve practical compensation we do not require that the accumulated negative dispersion be reduced to exactly zero; slight undercompensation or over-compensation may be tolerable depending on the system specifications.

In those applications where the transmitter generates a multiplicity of signals at different wavelengths above about 1300 nm (e.g., as the channel carrier signals in a DWDM system), the MOF segment provides relatively high anomalous dispersion at all of the wavelengths and hence compensation, at least to some extent, for all of the channels. Of course, in a multi-wavelength system the compensation cannot be perfect at every wavelength since the dispersion of a MOF is itself wavelength dependent. However, it is well known that practical fiber optic systems have an acceptable range of dispersion error, and the length of the MOF can be chosen so that dispersion is compensated over as wide a wavelength range as possible. For example, the length of the MOF could be chosen to produce essentially perfect compensation at the center wavelength of a WDM system, in which case wavelengths nearer the edges of the range will experience imperfect dispersion compensation.

It is to be understood that the above-described arrangements are merely illustrative of the many possible specific embodiments that can be devised to represent application of the principles of the invention. Numerous and varied other arrangements can be devised in accordance with these principles by those skilled in the art without departing from the spirit and scope of the invention.

What is claimed is:

1. A fiber optic system comprising an optical transmitter, an optical receiver, an optical fiber transmission path that optically couples said transmitter and said receiver to one another, characterized in that said transmission path comprises a first section that has negative dispersion at an operating wavelength $\lambda_0$ greater than about 1300 nm and a second section that includes a microstructure fiber, said microstructure fiber having a relatively large anomalous dispersion at said wavelength $\lambda_0$ and being sufficiently long to compensate the accumulated negative dispersion in said first section, said transmitter generates an optical signal that includes at least one component at said wavelength $\lambda_0$, and said microstructure fiber comprises a core region in which said optical radiation propagates, an inner cladding region surrounding said core region and having an effective refractive index lower than that of said core region, an outer cladding region surrounding said inner cladding region, said inner cladding region including a multiplicity of features positioned circumferentially in at least one relatively thin layer around said core region, said features being effective to provide index guiding of said radiation, and said core region and said inner cladding region being mutually adapted so that said fiber exhibits relatively large anomalous group velocity dispersion at wavelengths above about 1300 nm, said core region has a diameter less than about 8 μm and the difference in effective refractive index between said core region and said inner cladding region is greater than about 10%.

2. The invention of claim of 1 wherein the outer boundary of said features is less than about 10–30 μm from the outer boundary of said core region.

3. The invention of claim of 2 wherein said features are positioned circumferentially in a multiplicity of relatively thin layers.

4. The invention of claim 1 wherein said inner cladding region includes capillary air holes that form said features.

5. The invention of claim 4 wherein said air holes are positioned circumferentially around said core region in no more than two relatively thin layers and the distance between the nearest edges of adjacent ones of said holes is less than about 1 μm.

6. The invention of claim 1 wherein the pattern formed by said features comprises geometric figure selected from the group consisting of a hexagon and a triangle.

7. The invention of claim 1 wherein said core region and said cladding regions comprise silica.

8. The invention of claim 1 wherein said features comprise capillary air holes and said fiber exhibits anomalous group velocity dispersion greater than approximately 20 ps/nm-km over a wavelength range from about 1200 nm to about 1700 nm.

9. The invention of claim 8 wherein said features comprise capillary air holes and said fiber exhibits anomalous group velocity dispersion greater than approximately 50–200 ps/nm-km over said wavelength range from about 1200 nm to about 1700 nm.

10. The invention of claim 1 wherein said optical transmitter comprises a laser-based transmitter.

11. The invention of claim 1 wherein said first section is much longer than said second section, and the absolute value of dispersion in ps/nm in said second section is much larger than that in said first section.

12. The invention of claim 1 wherein said transmitter generates a multiplicity of signals at different wavelengths greater than about 1300 nm and said microstructure fiber provides relatively large anomalous dispersion at each of said signal wavelengths.

* * * * *